United States Patent

[11] 3,633,715

[72] Inventor: Richard T. Burnett
South Bend, Ind.
[21] Appl. No. 669
[22] Filed: Jan. 5, 1969
[45] Patented: Jan. 11, 1972
[73] Assignee: The Bendix Corporation

[54] DISC BRAKE WITH SPRING BRAKE AND PRESSURE-COMPENSATING SELF-ADJUSTER
3 Claims, 4 Drawing Figs.

[52] U.S. Cl.................................................. 188/170,
188/71.8, 188/72.4, 188/106 P, 188/170, 188/196 D
[51] Int. Cl.......................................................... F16d 65/24
[50] Field of Search............................................ 188/71.8,
71.9, 72.4, 72.3, 106 P, 106 F, 196 R, 196 D, 79.5 GE, 170

[56] References Cited
UNITED STATES PATENTS

| Re26,106 | 11/1966 | Dotto | 188/72.4 X |
|---|---|---|---|
| 2,801,712 | 8/1957 | Lockhart | 188/71.8 |
| 2,809,723 | 10/1957 | Howze | 188/106 F |
| 2,854,954 | 10/1958 | Howze | 188/106 F |
| 3,365,029 | 1/1968 | Swift | 188/71.8 |

*Primary Examiner*—George E. A. Halvosa
*Attorneys*—C. F. Arens and Plante, Arens, Hartz, Smith & Thompson

ABSTRACT: A disc brake actuator is disclosed which includes a piston for urging the brakeshoes toward a rotor and an automatic adjuster to properly position the piston in the actuator housing. The adjuster is actuated by relative movement between it and the piston and is mounted on a member that reciprocates with the piston during high-pressure brake applications thus precluding adjustment, but is held stationary during low-pressure applications to permit operation of the adjuster. Such a compensated adjuster is particularly useful when mechanical actuation is provided in addition to the usual hydraulic actuator.

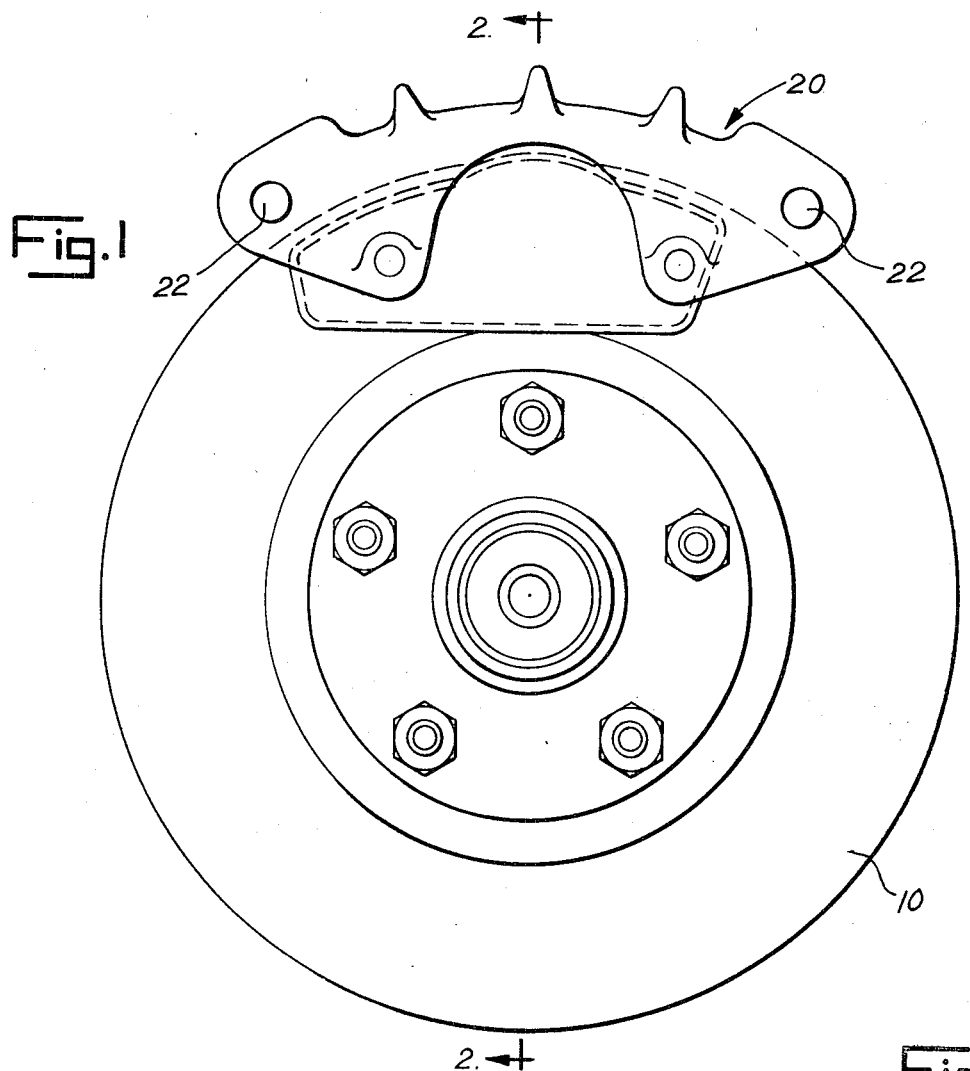
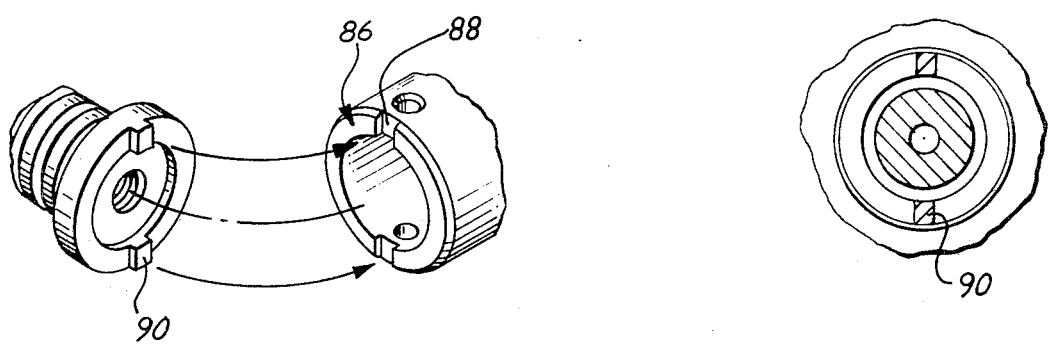

INVENTOR.
RICHARD T. BURNETT
BY Plante, Arens, Hartz, Smith & Thompson
ATTORNEYS

DISC BRAKE WITH SPRING BRAKE AND PRESSURE-COMPENSATING SELF-ADJUSTER

BACKGROUND OF THE INVENTION

Many modern disc brakes have adjustment mechanisms to insure that the friction pads retract the proper distance despite wear of the friction material. However, a problem inherent in prior art disc brake adjusters is their tendency to overadjust when fluid at high pressure levels is abruptly applied to the brakes in, for example, "panic stop" situations. The actuating piston then moves a much greater distance than normal because of the higher elastic deflections of the brake members, often resulting in overadjustment of the brake. In prior art devices, the shoes would often drag against the friction faces of the rotor unless relatively large piston retraction movement was permitted by the adjuster.

Another problem is designing disc brakes is that a suitable parking actuator must be provided if disc brakes are to be used on all wheels of the vehicle. Such a mechanism is disclosed in pending U.S. application Ser. No. 797,530, filed Jan. 16, 1969, owned by the assignee of the instant application. This application teaches a disc brake which includes a spring actuator that not only serves as a parking actuator, but also applies the brake if both of the brake hydraulic systems should fail when the vehicle is in motion. However, this design, as in most prior art disc brake parking actuators, provides a very limited applying stroke, requiring that the piston retract a minimum distance. Therefore, it is particularly important in disc brakes having parking actuators, including those of the type described in the aforementioned U.S. application Ser. No. 797,530, that they be provided with a compensating device which limits operation of the adjuster mechanism to pressure levels below a few hundred pounds per square inch.

SUMMARY OF THE INVENTION

Therefore, an important object of my present invention is to provide a compensator for a disc brake which limits operation of the adjuster mechanism to relatively low actuating pressure levels.

Another important object of my invention is to provide a compensating adjuster for a brake having a spring actuator.

DESCRIPTION OF THE DRAWINGS

FIG. 1 is a side elevational view of a disc brake made pursuant to the teachings of my present invention;

FIG. 3 is a perspective view illustrating the manner in which two components of the brake illustrated in FIGS. 1 and 2 engage one another; and FIG. 4 is a cross-sectional view taken along lines 4—4 of FIG. 2.

DETAILED DESCRIPTION

Figure 2:
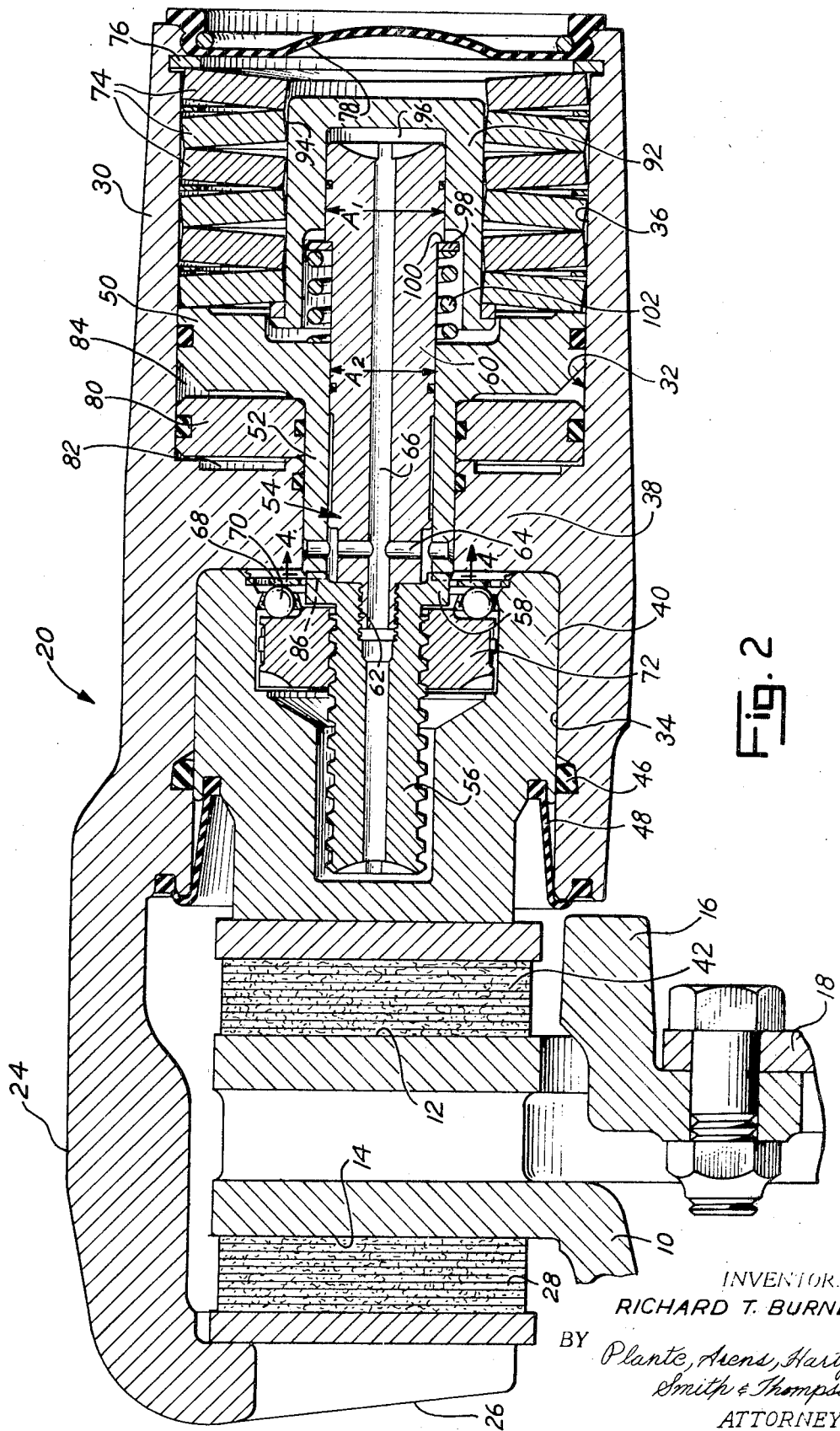
FIG. 2 is a cross-sectional view taken along line 2—2 of FIG. 1.

Referring now to the drawings, a rotor 10 is mounted for rotation with a member to be braked and has a pair of opposed friction faces 12 and 14. A torque member 16 is bolted to a nonrotative part of the vehicle, such as the axle flange 18. A caliper 20 is slidably mounted on the torque member 16 through a pair of pins 22, as is more completely described in my U.S. Pat. No. 3,388,774, owned by the assignee of the present application.

Caliper 20 includes a bridgepiece 24 straddling the rotor 10, a radially inwardly extending portion 26 which carries a friction element 28 adjacent the friction face 14, and an annular housing 30 defining a bore 32 therewithin. The bore 32 is divided into first and second coaxial chambers 34 and 36 respectively by an annular partition 38. A piston 40 is slidably carried in the chamber 34 and is adapted to urge a friction element 42 which is slidable on the torque member 16 toward the friction face 12. The rear face of the piston 40 is communicated with a source of fluid pressure (not shown) which slides the piston 40 in the chamber 34. An annular seal 46 prevents fluid from escaping from the chamber 34 and also returns the piston 40 to the brake-release position when the fluid pressure acting on the piston is reduced, as taught in my prior U.S. Pat. No. 3,377,076, owned by the assignee of the present invention and incorporated herein by reference. The usual flexible boot 48 interconnects the piston 40 and the housing 30 to exclude contaminants from the bore 32.

A movable wall 50 is slidable in the second chamber 34 and has an annular axially extending section 52 which is slidably supported by the partition 38. An elongated member 54 extends through the partition 38 and is slidably supported by the axially extending section 52. The member 54 includes a threaded section 56 having a radially projecting shoulder 58 on one end thereof and a rearwardly extending section 60 joined to the section 56 by the threaded connection 62. Radially extending fluid passages 64 are provided in the section 60 to communicate a fluid conduit 66 extending axially through the member 54 with a source of fluid pressure (not shown). A washer 68 carried by the piston 40 engages an antifriction device 70 disposed between the washer 68 and an adjuster nut 72 rotatably mounted on the threaded section 56 as is more completely described in my copending U.S. application Ser. No. 863,481, owned by the assignee of the present invention, and incorporated herein by reference.

The spring actuation provided in the present brake includes a number of annular, resilient Belleville washers 74 disposed in the chamber 36 between one side of the movable wall 50 and a retainer ring 76 carried by the housing 30. The washers are compressible from the generally conical configuration illustrated in FIG. 2 to a substantially flat configuration, the resiliency of the washers biasing the latter toward the conical configuration. An end closure 78 is also provided that closes the end of the chamber 36.

A floating piston 80 is disposed between the other side of the movable wall 50 and the partition 38 and defines a pair of fluid chambers 82 and 84 between the piston 80 and the partition 38 and between the piston 80 and the movable wall 50, respectively. Each of the chambers 82, 84 is communicated to one of a pair of brake hydraulic pressure sources (not shown) as is more completely described in the aforementioned U.S. application Ser. No. 797,530. The end 86 of the axially extending section 52 is adapted to engage the shoulder 58 so that, upon release of the washers 74, movement of the wall 50 will also drive the elongated member 54 and the adjuster nut 72 toward the rotor 10. End 86 is provided with a channel 88 which is adapted to receive lugs 90 on the shoulder 58, as shown in FIG. 3, to prevent relative rotation between the wall 50 and the member 54.

A closed end cylinder 92 is supported by elongated member 54 in the bore 94 defined by the Belleville washers 74 and slidably receives one end of the elongated member 54. A variable volume chamber 96 is defined between the end of the member 54 and the closed end of the cylinder 92 which is communicated with the conduit 66. A washer 98 circumscribes the outer surface of the member 54, engaging a shoulder 100 formed thereon. A resilient member 102 is interposed between the washer 98 and the movable wall 50 to yieldably bias the member 54 toward the closed end of the cylinder 92.

MODE OF OPERATION

As long as fluid pressure is available to either of the chambers 82 or 84, the fluid pressure cooperating with the floating piston will maintain the movable wall 50 in a position compressing the washers 74 into their substantially flat configuration. The piston 40 is in the retracted position when the chambers 82 and 84 are pressurized. To apply the service brake, the vehicle operator depresses the appropriate pedal in the operator's compartment, thereby causing pressurized fluid to flow through the radially extending passages 64, through the conduit 66 to the rear face of the piston 40 to urge the latter and therefore the friction pad 42 toward the friction face 12 on the rotor 10. Those skilled in the art will recognize that due to the sliding connection between the caliper 20 and the torque member 18, reaction forces acting through the bridgepiece 24 will urge the friction element 28 against the friction face 14 upon the movement of the piston 40.

If the piston 40 must move an abnormal amount during the applying stroke due to the wear of the friction elements, the washer 68 will apply an axially directed force to the adjuster nut 72 through the antifriction means 70. As described in the aforementioned U.S. application Ser. No. 863,481, this axially directed force rotates the adjuster nut 72 on the threaded section 56, thereby advancing the nut 72 toward the rotor 10. Upon release of the brakes, the piston 40 will retract only enough to bring the rear face of the piston into engagement with the nut 72. Therefore, while the applying stroke of the piston 40 may vary due to wear of the friction elements 28, 42, the return stroke is maintained substantially constant since the increased applying stroke of the piston 40 also advances the nut 72 on the member 54.

In prior art devices, when high fluid pressure was abruptly applied to the piston, as in "panic stop" situations, the piston 40 would travel an abnormal amount during the applying stroke, not because of wear of the friction elements, but because of elastic deflections in the brake itself. Obviously, this movement of the piston would also advance the nut 72 on the member 54, and therefore, the piston would not retract the proper amount to assure that the friction elements would not drag against the friction faces of the rotor when the brake was released.

In the present device, the conduit 66 not only communicates fluid pressure to the rear face of the piston 40, but also admits fluid pressure into the variable-volume chamber 96. Since the cross-sectional area A1 of the section 60 is greater than the cross-sectional area A2 of the section 60, fluid pressure in the chamber 96 will apply a force to the member 54 tending to move the latter toward the rotor 10. At low pressure levels, the resilient member 102 prevents the member 54 from moving toward the rotor 10, thereby permitting the washer 68 to advance the nut 72 toward the rotor 10 should this be necessary due to wear of the friction elements. At higher fluid pressure levels, the net force acting on the member 54 overcomes the bias of the resilient member 102 and member 54 moves toward the rotor 10 with the piston 40. Since the nut 72 moves with member 54, the washer 68 cannot apply an axial force to the nut 72, and therefore the latter will not be advanced on the threaded section 56. Therefore, no adjustment will take place, and the retraction of the piston will be the same as before the high-pressure application. Upon release of the brakes, the resilient member 102 returns the elongated member 54 and adjuster nut 72 carried thereupon to their initial position. It should be noted that the elongated member slides within the axially extending section 52 of the movable wall 50, and as the member slides, the shoulder 58 separates from the end of the section 52, the latter remaining stationary.

As described in the aforementioned U.S. application Ser. No. 797,530, should fluid pressure be reduced in the chambers 82, 84 due either to a failure in both of the vehicle's hydraulic systems or because the vehicle operator manipulates a valve relieving fluid pressure in the chambers 82, 84, the washers 74 will relax from a substantially flat configuration into their generally conical configuration illustrated in FIG. 2, thereby urging the movable wall 50 toward the rotor 10. Due to the engagement of the end 86 of the axially extending section 52 with the shoulder 58, movement of the movable wall 50 will also urge the member 54, nut 72, and therefore the piston 40 and friction elements 28 and 42 towards the rotor 10, to apply the brake. When the chambers 82, 84 are repressurized, the movable wall 50 is forced to the right viewing FIG. 2, thereby permitting the resilient member 102 to return the elongated member 54 and the piston 40, and permitting the seal 46 to return the piston 40, to the brake release position.

I claim:

1. In a disc brake having a rotor and a pair of friction elements disposed on opposite sides of said rotor:
   a housing defining a bore therewithin divided into first and second coaxial chambers;
   a piston slidable in said first chamber toward and away from said rotor;
   an elongated member slidably carried by said housing, and having the opposed ends thereof disposed in said first and second chambers respectively;
   mechanism carried on said member adapted to engage said piston for limiting retraction of the latter;
   a movable wall slidable in said second chamber from a rearwardmost position to a forwardmost position;
   releasable resilient means operatively connected to said housing and said movable wall for urging the latter from said rearwardmost position to said forwardmost position upon release of the resilient means;
   coupling means joining said movable wall and said elongated member for movement together when the movable wall is urged toward the forwardmost position;
   said coupling means permitting relative movement between the member and the wall when the movable wall is disposed in the rearwardmost position;
   said mechanism being an automatic adjuster mounted for movement on said member toward one end of the latter upon relative movement between the adjuster mechanism and the piston for positioning the latter in the fore;
   a closed end cylinder mounted in said second chamber slidably receiving the other end of said member;
   said cylinder and said other end defining a variable-volume chamber therebetween;
   spring means engaging said member for biasing the latter toward the closed end of said cylinder; and
   a conduit for simultaneously admitting pressurized fluid into said first chamber for forcing the piston toward the rotor and into said variable-volume chamber to urge the member from the cylinder against the bias of said spring means;
   said releasable resilient means having an annular opening therein coaxial with said first and second chambers;
   said opening receiving said cylinder, whereby said releasable resilient means is supported by said cylinder.

2. In a disc brake having a rotor and a pair of friction elements disposed on opposite sides of said rotor:
   a housing defining a bore therewithin divided into first and second coaxial chambers;
   a piston slidable in said first chamber toward and away from said rotor;
   an elongated member slidably carried by said housing, and having the opposed ends thereof disposed in said first and second chambers respectively;
   mechanism carried on said member adapted to engage said piston for limiting retraction of the latter;
   a movable wall slidable in said second chamber from a rearwardmost position to a forwardmost position;
   releasable resilient means operatively connected to said housing and said movable wall for urging the latter from said rearwardmost position to said forwardmost position upon release of the resilient means; and
   coupling means joining said movable wall and said elongated member for movement together when the movable wall is urged toward the forwardmost position;
   said coupling means permitting relative movement between the member and the wall when the movable wall is disposed in the rearwardmost position;
   said housing having an annular partition therein separating said first and second chambers;
   said movable wall having an axially extending annular section slidably supported by said partition;
   said axially extending annular section slidably receiving said elongated member.

3. The invention of claim 2:
   said elongated member having a radially projecting shoulder adapted to engage the end of said axially extending section;

said coupling means being a recess on said shoulder adapted to be engaged by a mating lug on the end of the axially extending section.

* * * * *